United States Patent
Lange

(10) Patent No.: US 9,053,308 B2
(45) Date of Patent: Jun. 9, 2015

(54) MULTI ELECTRO-BIOMETRIC USER RECOGNITION

(71) Applicant: Intel Corporation, Santa Clara, CA (US)

(72) Inventor: Daniel H. Lange, Kfar Vradim (IL)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 13/711,973

(22) Filed: Dec. 12, 2012

(65) Prior Publication Data

US 2014/0165185 A1   Jun. 12, 2014

(51) Int. Cl.
*G06F 21/32* (2013.01)
*G06K 9/00* (2006.01)

(52) U.S. Cl.
CPC ............ *G06F 21/32* (2013.01); *G06K 9/00892* (2013.01)

(58) Field of Classification Search
CPC ...................................................... G06F 21/32
USPC ............................................................ 726/19
See application file for complete search history.

(56) References Cited

U.S. PATENT DOCUMENTS

| | | | |
|---|---|---|---|
| 6,483,929 B1 * | 11/2002 | Murakami et al. | 382/115 |
| 6,961,448 B2 * | 11/2005 | Nichols et al. | 382/115 |
| 7,171,680 B2 * | 1/2007 | Lange | 726/5 |
| 7,358,515 B2 * | 4/2008 | Setlak et al. | 250/556 |
| 7,689,833 B2 | 3/2010 | Lange | |
| 8,019,321 B2 * | 9/2011 | Engstrom | 455/411 |
| 2004/0027246 A1 * | 2/2004 | Aguglia | 340/573.1 |
| 2008/0161707 A1 * | 7/2008 | Farringdon et al. | 600/509 |

OTHER PUBLICATIONS

U.S. Appl. No. 13/711,928, filed Dec. 12, 2012, entitled "Electro-Biometric Authentication."
U.S. Appl. No. 61/722,857, filed Nov. 6, 2012, entitled "Determining Social Sentiment Using Physiological Data."

* cited by examiner

*Primary Examiner* — Saleh Najjar
*Assistant Examiner* — Oleg Korsak
(74) *Attorney, Agent, or Firm* — Trop, Pruner & Hu, P.C.

(57) ABSTRACT

A pair of contacts on a processor-based device may be used to collect two different types of human physiological data. That data may then be used to authenticate the user of such a device.

15 Claims, 3 Drawing Sheets

MULTI ELECTRO-BIOMETRIC USER RECOGNITION

BACKGROUND

This relates generally to authentication and healthcare, and more specifically, but not by way of limitation, biometric user recognition.

Electrocardiography (ECG, or EKG) is a transthoracic interpretation of the electrical activity of the heart over time captured and externally recorded by, for example, electrodes in apposition with the skin. In ECG biometrics, as with other biometrics, there exists an inherent trade-off between quality of user experience (usability), as reflected in the false reject rate or false non-match rate (FRR or FnMR), and data separability (security), as reflected in the false accept rate or false cross match rate (FAR or FCMR). Receiver-Operator-Curves (ROCs) provide means to quantify such trade-offs, with different biometric technologies having their own characteristic ROCs. Some ROCs are biased toward providing high security at the expense of decreased usability, while others offer superior usability in exchange for lower security.

Fusion biometrics has been introduced to improve overall recognition performance by combining two or more, preferably independent biometric modalities. Fusion biometrics may be implemented, for example, at either the feature extraction level, the matching score level, and/or the decision level. Depending on the target parameter to be optimized, such as FAR or FRR, different fusion methods may be implemented. Some fusion methods necessitate full cross-modality recognition which lowers the FAR but may increase the FRR. Other fusion methods define just one modality sufficient to provide positive recognition which results in a decreased FRR but possibly increased FAR. Fusion schemes may become very complicated with many intermediate possibilities.

BRIEF DESCRIPTION OF THE DRAWINGS

Some embodiments are described with respect to the following figures.

DETAILED DESCRIPTION

Figure 1:
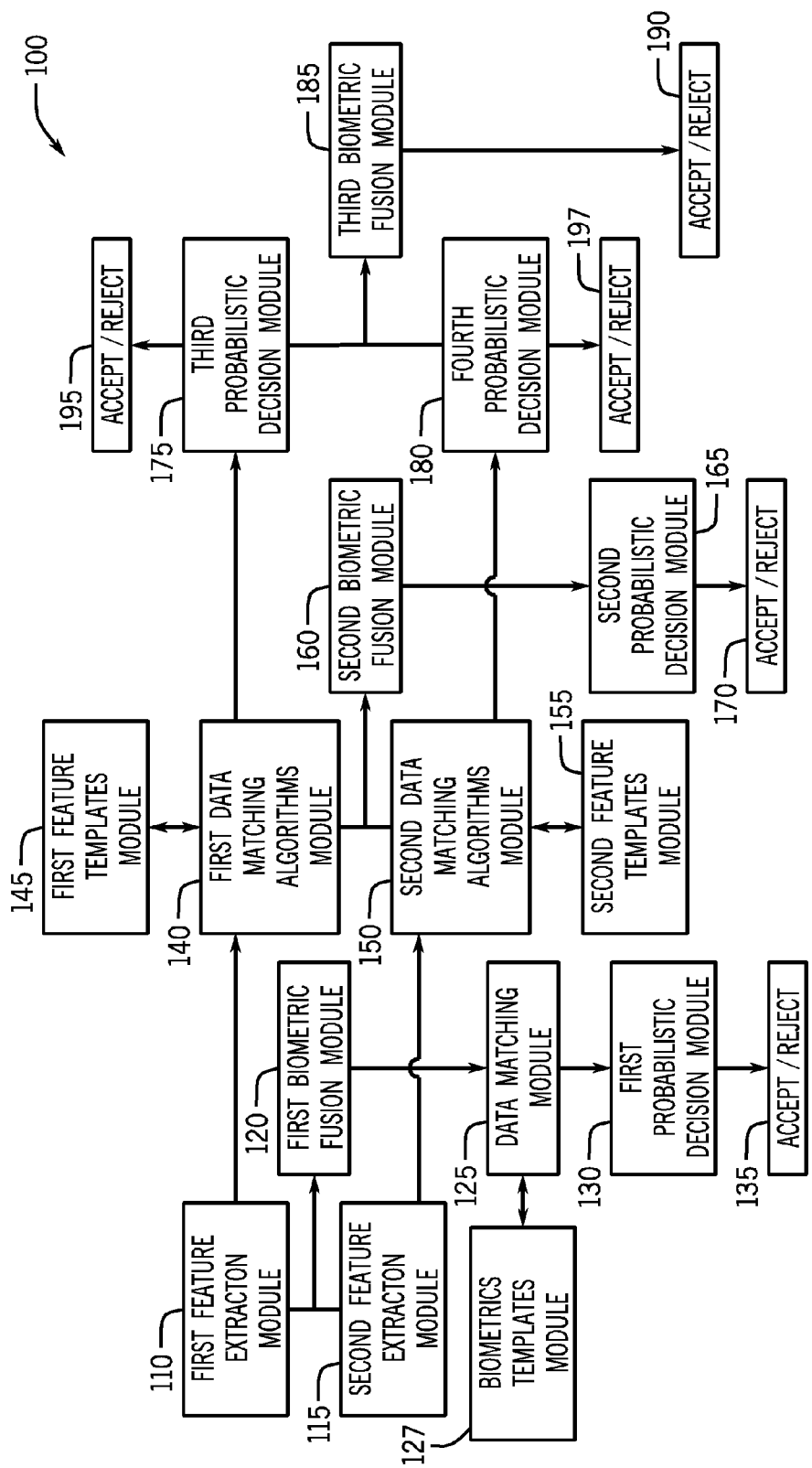
FIG. 1 is a schematic diagram of an exemplary architecture for practicing various embodiments according to the present technology.

One major concern with fusion biometrics is the additional effort required by the user to provide optimal biometric data in all modalities. For example, fingerprint and face recognition fusion may require correct placement of fingers as well as adequate lighting conditions and face positioning for the face capture. Unfortunately, most independent modalities require different sensor types and configurations; this may impose extra, often unreasonable, effort by the user to satisfy the requirements of the different modalities used.

There exists a need in the art, therefore, to provide multi-biometric systems employing a single sensor apparatus and thereby allowing user-friendly interaction of the user with the biometric system. It may be desirable for the user to attend to and satisfy only one set of physical measurement requirements instead of multiple sets of requirements.

Electrocardiogram (ECG) based biometrics typically relies on measurement of the electrical signal generated by the human heart during its normal contraction cycle. Such measurement can be made from two substantially opposite sides of the heart, such as from two hands, for example. The measurement is typically performed by placing at least two conductive surfaces in contact with two "sides" of the body.

Using fingers from two hands as the measurement contact points is particularly effective as it provides the same vector projection of the electrical activity of the heart. Alternatively, different body parts may be used but care must be taken to ensure that the same points of contact are subsequently used to prevent receiving different projections in different measurement instances. Again, a hand and different parts of the head can be used.

Another bio-electrical biometric modality, may be combined with ECG biometrics, which similar to ECG recording, is also sensitive to the actual points of contact. Therefore, using hands or fingers from both hands is one mode of use according exemplary embodiments. The left hand and an ear (left or right), nose, other parts of head, neck, etc. could be used in some embodiments. The right hand can be used for some people, depending on the location and posture of their heart. According to some embodiments, the left hand and an ear can be used (e.g., cell phone applications, etc.).

As used herein electro-biometric means using electrical signals indicative of distinguishing human physiological characteristic.

According to exemplary embodiments, body impedance as a "soft" (less stringent) biometry may be used to complement the "hard" (highly accurate) biometry obtained from ECG analysis. Measurement of body impedance, typically involving hands and/or feet, is commonly implemented for estimation of body composition, including fat content, total body water content, extra-cellular and intracellular water, fat-free mass, and body cell mass including muscle mass, etc.

In one embodiment, a single sensor apparatus may measure both ECG data and body impedance data. (However, it should be noted that in some embodiments, more than one sensor apparatus may be utilized). These two highly independent measurements of body impedance and ECG may be implemented by using the same sensor apparatus, where passive ECG measurement is used to register the electrical activity of the heart, and active injection of a micro-current into the body and measurement of the resulting voltage build up in response to the injected micro-current is used to register the body impedance. The micro-current can be injected in multiple frequencies and thereby allow measurement of an impedance profile of the body tissue amid the touch points. Such impedance profiling is sometimes referred to as "impedance spectroscopy."

Living tissues have long been known to have electrical properties, which have been a focus of scientific study. There exist specific properties related to the electrical impedance of human tissues. Electrical impedance typically refers to the opposition to the flow of electric current through, for example, biological tissues.

Biological electrical impedance, or bio-impedance, is currently employed in a number of technologies and methodologies at various stages of development and utilization. These include plethysmography and other blood flow measurements, biological imaging, specifically electrical impedance tomography, and estimation of body composition (including but not limited to fat content, total body water content, extracellular and intracellular water, fat-free mass, and body cell mass including muscle mass. In some embodiments bioelectrical impedance data may be used for biometric recognition to the extent that such data are specific to individuals and are stable or can be tracked over time.

Bioelectric impedance analysis utilizes basic electrical models. The simplest models treat the body as a uniform cylinder with a constant conductivity electrolyte. It can be shown that the volume of water is proportional to the conduction length (between electrodes) squared divided by the impedance R. Height, which is itself proportional to and more convenient to determine than conduction length, is usually employed instead. Better but more complex modeling techniques take the actual geometry and physiology into account in determining the actual relationships between water mass and impedance. Even more complex models examine not only resistance R (which is based on body fluid) but also capacitance or reactance (which is based on capacitive effects due to cell membranes). As both these factors are to some degree independent, useful indices and coefficients such as phase angle can be derived from their combination.

Bioelectrical impedance analysis (BIA) for body composition measurements itself utilizes a number of different approaches, which define the characteristics and parameters of specific electrical probe signals. Each approach requires complex mathematical models to determine body composition, including additional input of gender, height and other body dimensions, weight, and ethnic group, and can be influenced by hydration status, physical activity, health status, etc.

One of these methods is Single Frequency BIA (SF-BIA), which in typical applications entails a signal of 50 kHz passed between surface electrodes on hand and foot, or both feet, or both hands. The method can be used to estimate fat-free mass and total body water, using linear regression models.

Multi-frequency BIA (MF-BIA) is a similar method, which includes probe signals at a number of different frequencies (0, 1, 5, 50, 100, 200 to 500 kHz) to estimate fat-free mass, total body water, intracellular and extra-cellular water, also using linear regression models. These different frequencies can be differentially sensitive to different elements of body composition.

Bioelectrical spectroscopy (BIS) also utilizes a multi-frequency probe, but uses more sophisticated mathematical modeling approaches, including mixture equations, instead of or in addition to regression models.

Segmental BIA employs at least an additional two electrodes (with four electrodes in what is referred to as a tetra-polar configuration) and more complex bioelectrical models. These models better account for the relative relationships of differing body cross sectional areas of limbs versus trunk and their contributions to impedance measurements.

Bioelectrical impedance vector analysis (vector BIA or BIVA) utilizes analysis of a vector plot, usually created from numerical values of resistance R and reactance Xc. BIVA is primarily a graphical method that depends on comparison to well-defined reference plots derived from appropriate normal populations. Thus, BIVA dispenses with the need for complex mathematical models, and may be most useful for clinical purposes.

These methods can, to varying degrees of accuracy, determine such elements of body composition as fat-free mass, body fat, total body water, extracellular water, intracellular water, and body cell mass. Regression models used for these determinations have been compiled and characterized in the current literature. These models depend on knowledge of height and gender (and possibly more), and are often strongly dependent upon many additional demographic factors such as ethnic group, height, and other body dimensions, and potentially many other more-or-less individually specific static factors.

Some embodiments leverage this potential individual specificity and utilize bio-impedance as an identifying element of a biometric recognition system. Current biometric technologies utilize simple bio-impedance measurement for providing "proof of life" only, but not for recognition. While the individual specificity of bio-impedance is likely to be limited in practice, making it a "soft biometric," it can be combined with a stronger biometric, utilizing biometric fusion or multimodal biometrics, to significantly improve performance of the strong biometric. Sophisticated strategies according to the present technology based on a composite feature score increase accuracy, as opposed to systems based on combining outcome judgments of each separate system; the latter typically behave only as well as the weaker biometric.

Multimodal biometric recognition systems typically work best when they are derived from at least two unrelated physiological features, such as fingerprint and facial features. However, a need for two or more totally different data capture systems can limit such fusion in practice.

Electrophysiological measurements, such as the electrocardiogram and bioelectric impedance, typically reply on at least one set of electrodes placed somewhere on the body; except for certain extreme cases (e.g., severe pathology) ECG is independent of BIA. Data acquisition systems could employ the same pairs of active electrodes, or tetra-polar configurations, with separate electronics behind them for each mode of operation, allowing both modalities to share considerable hardware.

If only user recognition and not body composition analysis is required, the system may be operated with only bioelectric input. It should be noted that body composition itself is not required for biometric identification—only the raw electrical data need be acquired and compared to biometric enrollment templates. Thus, the uncertainties inherent in body composition analyses are avoided. If, on the other hand, body composition analysis is needed, then additional information would be entered to allow the correct models to be fit. Alternatively, static demographic information may be transparently obtained from a database after biometric authentication (slowly variable information such as weight may need to be re-entered in certain circumstances).

Electrophysiological measurements, in addition to or in place of electrocardiogram and bioelectric impedance, may be implemented. For example, in some exemplary embodiment one's DNA, body heat, perspiration, respiration, or any other suitable characteristic may be utilized. For example, a lie detector system may be used with ECG in one embodiment. It is envision that one, two, or more than two modalities may be used at the same time (e.g., ECG, body impedance, and some other modality). All permutations of modalities are contemplated for use in accordance with the present invention.

According to some embodiments, a bioelectric impedance vector may be used in combination with an ECG biometric signature to create a combined biometric feature vector. Subsequently, a first combined biometric feature vector calculated in an enrollment session may be compared with a second combined biometric feature vector calculated in a recognition session to determine positive or negative recognition. In some embodiments, multiple combined biometric feature vectors, calculated in previous enrollment and recognition sessions, are compared with a current combined biometric feature vector to determine positive or negative recognition.

According to some embodiments, if one biometric modality fails to provide its biometric features then the other biometric modality (alone in some embodiments) may be used to provide a biometric feature vector.

A confidence level of a current session may be calculated for a plurality of biometric modalities (or for each biometric modality) and the combined biometric feature vector may be calculated using a weighted analysis. The weights may be determined based on the confidence level of a plurality of biometric modalities (or each biometric modality) in the current session.

According to some embodiments, an ECG signal may be measured from at least two contact points touched with two hands or fingers from two hands. In other embodiments, the ECG signal may be measured from other body parts such as hands, ears, chest, back, forehead, or legs.

The bioelectric impedance, in some embodiments, may be measured using the same contact points that are used for the measurement of ECG. This may be accomplished by injecting a probing signal via the contact electrodes and measuring the consequent voltage build up via the same contact electrodes.

According to some embodiments, the bioelectric impedance may be measured using a tetra-polar electrode configuration, where the probing current is injected through one pair of electrodes and the consequent voltage build up is measured from a second pair of electrodes that also serves to measure the ECG signal.

In some embodiments, the bioelectric impedance may be measured at 50KHz. In other embodiments, the bioelectric impedance may be measured at multiple frequencies, such as (but not limited to)1 Hz, 5Hz, 1KHz, 50KHz, 200KHz, and 500 KHz. The bioelectric impedance may be measured using a white or colored noise input thereby providing a continuous impedance profile over a wide range of frequencies.

According to some embodiments, a single impedance value may be calculated at a single probe signal frequency. Alternatively, a vector of impedances may be calculated at multiple probe signal frequencies. In still other embodiments, an impedance profile may be calculated from a continuous range of probe signal frequencies.

It is contemplated that the magnitude and phase of an impedance value may be used to create a biometric index. In alternative embodiments, only the magnitude of the impedance value is used as a biometric index. In yet other embodiments, multiple magnitudes and phases may be used to create a biometric vector of indices.

According to some embodiments, the bioelectric impedance and ECG may be measured simultaneously by channeling the data through a parallel bank of filters, where at least one filter corresponds to ECG frequency range and at least one other filter corresponds to the probe signal frequency.

In some embodiments, the bioelectric impedance is measured first for a relatively short period of time, and subsequently ECG is measured for a longer period of time.

It is envisioned that fusing the two biometrics modalities may be performed at the match score level. In some embodiments, when score values of the hard biometric are borderline, and recognition is of limited confidence, then the score of the soft biometric may be fused with that of the hard biometric to increase the confidence or to invalidate the recognition.

According to some embodiments, three hard biometric score zones may be defined: an accept zone, reject zone, and grey zone. When score values of the hard biometric lie within the grey zone, then the score of the soft biometrics may be fused with that of the hard biometric. In other embodiments, multiple hard biometric score zones may be defined, with a different fusion rule with the soft biometric in each score zone.

Fusion of the hard biometric score and soft biometric score may be performed according to a sum rule, in a form of a weighted average of the two scores. In some embodiments, fusion of the hard biometric score and soft biometric score may be accomplished according to a decision tree, a linear discriminant analysis, or any other rule optimizing system performance.

According to some exemplary embodiments, the sensor apparatus is implemented in a dedicated housing and connected to a host device via an input/output (O/I) port such as a universal serial bus (USB), or other wired network connection such as Ethernet. In other various embodiments, the apparatus communicates, with or without data encryption, with a host via wireless communication such as Bluetooth, or WiFi. In further embodiments, the sensor apparatus communicates, with or without data encryption, with a host via the Internet or other communications network.

The sensor contacts may be embedded in the housing of an electrical device. According to some embodiments, the housing itself may include conductive parts serving as contact points for both the ECG and BIA data. It is also envisioned that the sensor contacts may be embedded within a hardware module which itself is embedded within a host device.

The contacts may be embedded within the buttons of a touch pad which itself may be embedded within the chassis of a laptop (notebook), netbook, or any other type of computer, computing, electronic, or other device. According to some exemplary embodiments, the buttons of a touch pad may be ready made of and/or include conductive material and serve as contact points for the biometric system. In another embodiment two contacts may be integrated into a mouse housing or button.

According to some embodiments, the contacts may be embedded within a remote control unit such as a television remote control unit. In other embodiments, the housing of the remote control unit may be made of, or include, conductive parts which may serve as contact points of the biometric system.

According to some embodiments, the contacts may be embedded in a wrist watch, where the back side of the watch (which is in apposition with the skin) is formed from a conductive material or is embedded within a conductive material. The front and/or side(s) of the watch may be made of or embedded within conductive material serving as additional contact points for the biometric system.

It is envisioned that the contacts may be embedded within the housing of any device, including but not limited to a land line phone, cellular phone, satellite phone, mobile phone, smart phone, personal digital assistant (PDA), tablet computer e-book reader, etc. In some embodiments, the housing of the device may be formed from and/or include conductive parts that serve as contact points of the biometric system. In yet other embodiments, contact points may be implemented as contact stripes and/or as contact points duplicated in one or more locations in the housing, so as to ensure adequate contact with the user's skin regardless of the orientation or location of holding.

Strong, accurate biometric system performance may be improved significantly by utilizing additional, independent biometric information from other systems. When such systems utilize at least two different biometric modalities (e.g., fingerprinting and face biometrics), they are terms multimodal biometrics systems; the technique used to combine the information is referred to as biometric fusion.

Fusion may be implemented at different levels, from sensor acquisition of multiple types of biometric data to the final decision process of the systems. Typically, the greater the degree of independence of each type of biometric data, the more unique the information is that is provided about the individual.

When one biometric is "strong", that is, based on accurate, strongly individualized features (e.g., iris, fingerprint, etc.), and the other "soft", based on ancillary features that are not unique specifiers (e.g., height, gender, etc.), the biometrics may still be profitably fused. It is contemplated that the soft biometric may be used as a preliminary filter, to both narrow down and speed the search for matches. However, in some circumstances this may magnify inaccuracies in the soft biometric, particularly if this is a continuous scale measure. Further, resolving "grey area" cases returned by the strong biometric is typically not beneficial.

According to some embodiments, Bayesian statistical procedures may be implemented to utilize the strong biometric as the primary system, and the soft biometric as the secondary system. Bayesian inferential statistical methods utilize preliminary probability information, the "prior probability," to determine the likelihood of a particular hypothesis (the probability that the hypothesis is true or correct) given some observed evidence. The hypothesis is then given an updated "posterior probability" of being true—a conditional probability based on the relevant evidence. Essentially, the strong primary biometric provides the "prior probability" of identification or identity verification, which is further processed with regard to the soft biometric to provide an improved "posterior probability" estimate of identification or identity verification.

For sake of illustration, assume we have a database comprised of n members, represented by $w_1, w_2 \ldots, w_n$, and let x be the vector of features that represent the information from the primary strong biometric. Assume that the output of the primary biometric system is of the form $P(w_1|x), i=1,2,\ldots,n$. $P(w_1|x)$ represents the conditional probability that the test user is $W_1$ based on observing feature vector x from the primary biometric. $P(w_1|x)$ is then used as the prior probability, the initial estimate of the user being $W_1$ for the secondary biometric system.

We may use a generalized form for the soft biometric, allowing for more than a single soft biometric feature. We may then define the feature vector for the soft biometric as y, where $y=[y \ldots, y_k, y_k+1, \ldots, y_m]$ and $y_1$ through $y_k$ are continuous variables (continuous biometric scores), and $y_k+1$ through $y_n$ are discrete variables (nominal biometric matches to gender, ethnic group, eye color, etc.). Along with the prior probability information we may use Bayes rule to express the probability of being user $W_1$, given appropriate biometric scores on both x and soft y biometrics (that is, $P(w_1|x,y)$, the probability of being the subject given decisions on both feature vectors):

$$P(w_1 \mid x, y) = \frac{p(y \mid w_i)P(w_i \mid x)}{\sum_{i}^{n} = 1 p(y \mid w_i)P(w_i \mid x)}.$$

Assuming independence of the soft biometric features, we can rewrite the model as:

$$P(w_1 \mid x, y) = \frac{p(y_1 \mid w_i) \ldots p(y_k \mid w_i)P(y_{k+1} \mid w_i) \ldots P(y_m \mid w_i)Pw_i \mid x)}{\sum_{i}^{n} = 1 p(y_1 \mid w_i \ldots p(y_k \mid w_i)P(y_{k+1} \mid w_i) \ldots P(y_m \mid w_i)P(w_i \mid x)}$$

The probability model may be simplified by taking logarithms thusly:

$$\log P(w_1|x,y) \log p(y_1|w_i) + \ldots \log p(y_k|w_i) + \log P(y_{k+1}|w_i) + \ldots + \log P(y_m|w_i) + \log P(w_i|x) - \log p(y),$$

Until this point, the model does not distinguish between differing accuracies of the strong and soft biometric models, or between soft biometrics of differing accuracies. By utilizing a weighting system to account for both in a generalized discriminant model, the probability of being the genuine subject $g_i(x,y)$ based on both types of biometric can be expressed as follows:

$$g_i(x,y) = a_0 \log P(w_i|x) + a_1 \log p(y_1|w_i) + \ldots + a_k \log P(y_k|w_i) + a_{k+1} \log P(y_{k+1}|w_i) + \ldots + a_m \log P(y_m|w_i),$$

The sum of all the a weights is 1, and the first weight, $a_0$, which is characteristic of the strong primary biometric system (x) is much higher than the all of the other a weights associated with the multiple soft biometrics. The optimization and tuning of the weights is strongly dependent on the biometric modalities themselves.

This technique may be applied to a combined ECG biometric and bioelectric impedance system, where the strong ECG biometric signal is a strong biometric and the bioelectric impedance, being a generalized electrical phenomenon derived from features of body composition (e.g. fat, water, etc.), may be utilized as a soft biometric. These two modalities provide a particularly good match for Bayesian biometric fusion:

Both biometrics are non-trivially independent, maximizing the unique information available from each. Any connection between body composition and biometric ECG may likely exist in severe cardiac pathologies associated with, say, obesity, being under-weight, etc.

It is contemplated that according to some embodiments, biometric modalities may be obtained from the same sensor contacts and same user interaction.

It will be understood that in "grey area" verifications or identifications, uncertainty in the primary biometric may be advantageously resolved with the soft biometric. This may depend on careful weighting of the contribution of the secondary bioelectric impedance contribution—weights can be devised so as to emphasize their contribution in such cases. Alternatively, the soft biometric may be called into play with Bayesian methods in grey area cases, or potentially only in grey area cases, as a decision maker.

Referring now to FIG. 1, a schematic diagram 100 of an exemplary architecture for practicing various embodiments include a first feature extraction module 110 communicatively coupled with a second feature extraction module 115, a first biometric fusion module 120, and a first data matching algorithms module 140. The first biometric fusion module 120 is communicatively coupled with a data matching module 125. The data matching module 125 is communicatively coupled with a biometrics template module 127 and a first probabilistic decision module 130. The first probabilistic decision module 130 leads to an accept/reject block 135.

The first data matching algorithms module 140 is communicatively coupled with a first feature templates module 145, a second data matching algorithms module 150, a second biometric fusion module 160, and a first probabilistic decision module 175. The second data matching algorithms module 150 is communicatively coupled with a second feature templates module 155. The second biometric fusion module 160 is communicatively coupled with a second probabilistic decision module 165, which in turn leads to an accept/reject block 170.

A third probabilistic decision module 175 is communicatively coupled with a fourth probabilistic decision module 180 and a third biometric fusion module 185. The third probabilistic decision module 175 also leads to an accept/reject box 195. The fourth probabilistic decision module 180 leads to an accept/reject box 197. The third biometric fusion module 185 leads to an accept/reject box 190.

Figure 2:
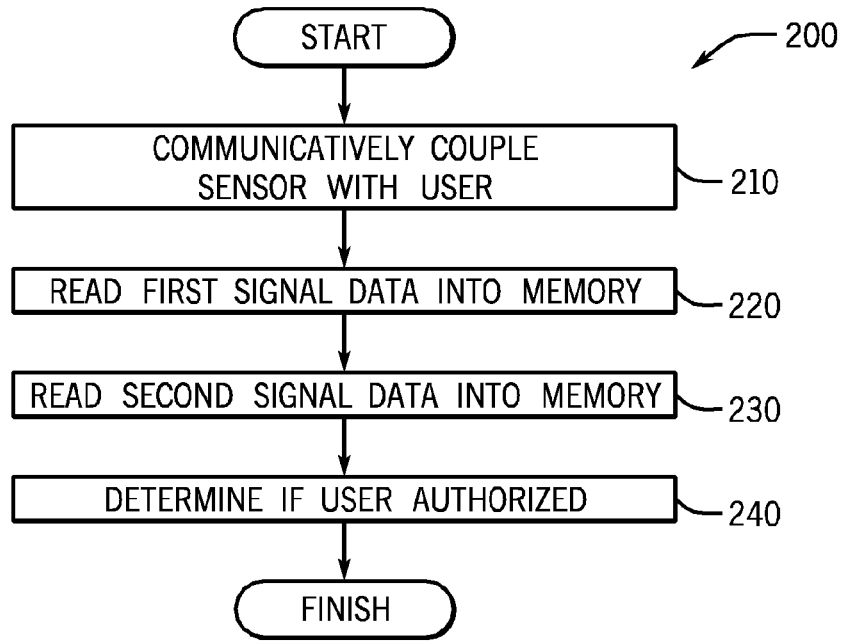
FIG. 2 is a flow chart of an exemplary methodology for practicing various embodiments according to the present technology.

Referring to FIG. 2, a sequence 200 may be implemented in software, firmware and/or hardware. In software and firmware embodiments, the sequence may be implemented by computer executed instructions stored in one or more non-transitory computer readable media such as magnetic, optical or semiconductor storages.

According to some exemplary embodiments, a sequence is contemplated for electro-biometric user recognition using a sensor of a signal processing device. In block 210, the sequence may comprise communicatively coupling the sensor of the signal processing device with a user. According to some embodiments, this may entail a conductive medium coming into apposition with the skin of a user. The fact that measurements are going to be taken from the user may be known to the user, or it may be unknown and transparent to the user. For example, the user may be holding a cellular or other device with an element(s) such as a conductive housing, bezel, etc. The conductive element may be in apposition with the skin of the user. A sensor may be communicatively coupled with the conductive element.

It is envisioned that multiple sensors may be utilized. However, in some embodiments only a single sensor is utilized. Utilizing a single sensor may be advantageous over systems that require, for example, a retina to be positioned correctly with respect to a first sensor, and a finger to be positioned correctly with respect to a second sensor. Additionally, utilizing a single sensor may, in some cases, improve the chances that measurements being taken will be transparent or unknown to the user. Utilizing the same sensor configuration to provide input to two or more systems may allow for a user the experience of operating just one system. In some embodiments, the sensor is seamlessly embedded within a device so that the user may be unaware of any measurements being taken.

In block 220, first signal data may be derived from the subject via the sensor and the signal processing device may be read into a first memory. The first signal data may relate to, for example, the ECG (EKG) of the user (or any other physiological mechanism). It is contemplated that any type of electrical activity, muscle activity, etc. that can be measures from the skin may be utilized. A first set of parameters may be extracted from the first signal data.

In block 230, second signal data derived from the subject via the sensor and the signal processing device may be read into a second memory. The second signal data may relate to, for example, body impedance of the user (or any other physiological mechanism). A second set of parameters may be extracted from the second signal data. Block 220 may be performed before, after, or simultaneously with block 230.

In block 240, it may be determined whether the user is authorized from the first signal and/or first set of parameters, the second signal and/or second set of parameters, and authorized user data. The authorized user data, in some embodiments, may be previously stored data that relates to the authorized user (or users) of the device (e.g., cell phone, etc.). It is also noted that unauthorized data may be used for comparison in order to eliminate a given user or users from access to a device.

It is envisioned that additional modalities may be utilized in accordance with embodiments of the present technology. Examples include body fat measurement, water measurement, any response of the skin to external stimuli (e.g., galvanic skin response (GSR)), dehydration, levels of various substances in the body, changes in moisture, sweat, and/or sweat glands, and any other type of bioelectric reading. Muscle activity is yet another example of a modality that may be introduced (e.g., electromyography (EMG)). It is also contemplated that emotion-related analysis can be used for authentication (e.g., mood detection, lie detection, etc.).

Figure 3:
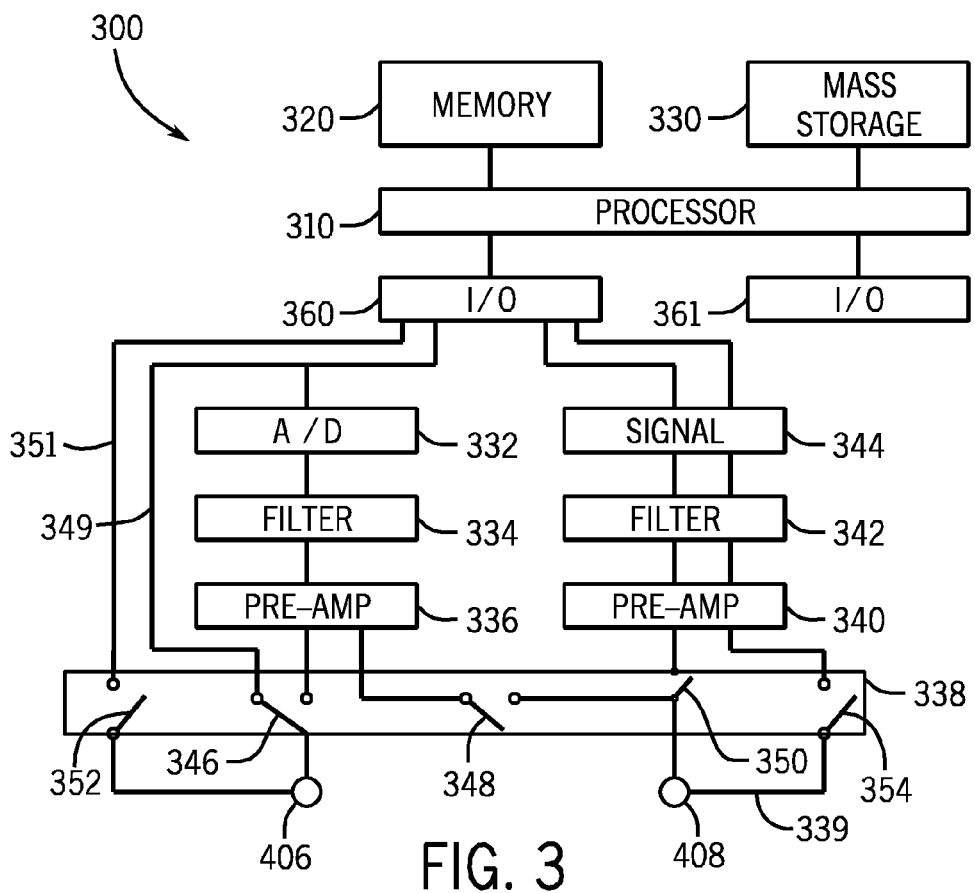
FIG. 3 is a block diagram of an exemplary system for practicing various embodiments according to the present technology.

FIG. 3 illustrates an exemplary computing system 300 that may be used to implement embodiments according to the present technology. The computing system 300 of FIG. 3 includes one or more processors 310 and memory 320. Main memory 320 stores, in part, instructions and data for execution by processor 310. Main memory 320 can store the executable code when the system 300 is in operation. The system 300 of FIG. 3 may further include a mass storage device 330, and user input devices 360 and 361.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Input device interface 360 provide a portion of a user interface. Input devices may include an alphanumeric keypad, such as a keyboard, for inputting alphanumeric and other information, or a point device, such as a mouse, a trackball, stylus, or cursor direction keys. One or more embodiment sensors 406 and 408, for example in the form of human body securable electrodes, may be coupled through a preamplifier 336, signal filtering 334 and analog/digital converter 332 to the input/output device interface 360.

The components contained in the computing system 300 of FIG. 3 are those typically found in computing systems that may be suitable for use with embodiments of the present invention and are intended to represent a broad category of such computer components that are well known in the art. Thus, the computing system 300 of FIG. 3 can be a personal computer, hand held computing system, telephone, mobile computing system, workstation, server, minicomputer, mainframe computer, or any other computing system. The computer can also include different bus configurations, networked platforms, multi-processor platforms, etc.

Body securable electrodes or contacts 406 and 408 may be provided on a surface of a processor-based device. Then when the user makes contact with these electrodes, signals may be derived from human physiological characteristics. Thus in one embodiment, the two electrodes may be positioned so as to be contacted on opposite sides of the human index finger. The voltage signals from the electrodes are passed to a preamplifier 336 and on to filters 334 such as band pass filters.

The filtered signals then pass to an analog to digital converter 332. Thus signals may be received from the electrodes 406 and 408 in one embodiment.

In embodiments in which both voltage and current signals are sensed and particularly those embodiments that sense both heart-related and body impedance-related measurements, a tetrapolar electrode may be utilized in order to enable the body impedance measurements. The tetrapolar electrode may be made up of four separate electrodes or two electrodes in two discrete elements which are internally, electrically divided.

In another embodiment, current signals may be provided to the electrode 406 and output signals received from the electrode 408 and passed back to the input device 360 for processing. For example, in connection with body impedance measurement techniques, current signals may be driven through one divided electrode 406, via lines 349 and 351, and outputs received from the other divided electrode 408 and passed back for analysis via lines 338 and 339. In the embodiment illustrated in FIG. 1, the current signal is driven through the electrode 406 and the output is taken through the electrode 408.

The output current signals from the electrode 408 may be pre-amplified (340), filtered (342) and signal processed (344). Switches 346, 348, 350, 351 and 352 may be provided to switch between receiving voltage signals on both of the electrodes 406 and 408 and passing a current signal through one electrode 406 and receiving an output current signal from the electrode 408. Conventional electrical switches, such as transistor switches, may be used for this purpose. For example, a voltage signal may be sensed when switch 346 is connected to pre-amplifier 336, switch 348 is closed and switches 350, 352 and 354 are open. A current signal may be sensed when switch 346 is connected to current source line 349, switch 352 is connected to source line 351, switches 350, 352 and 354 are closed and switch 348 is open.

Figure 4:
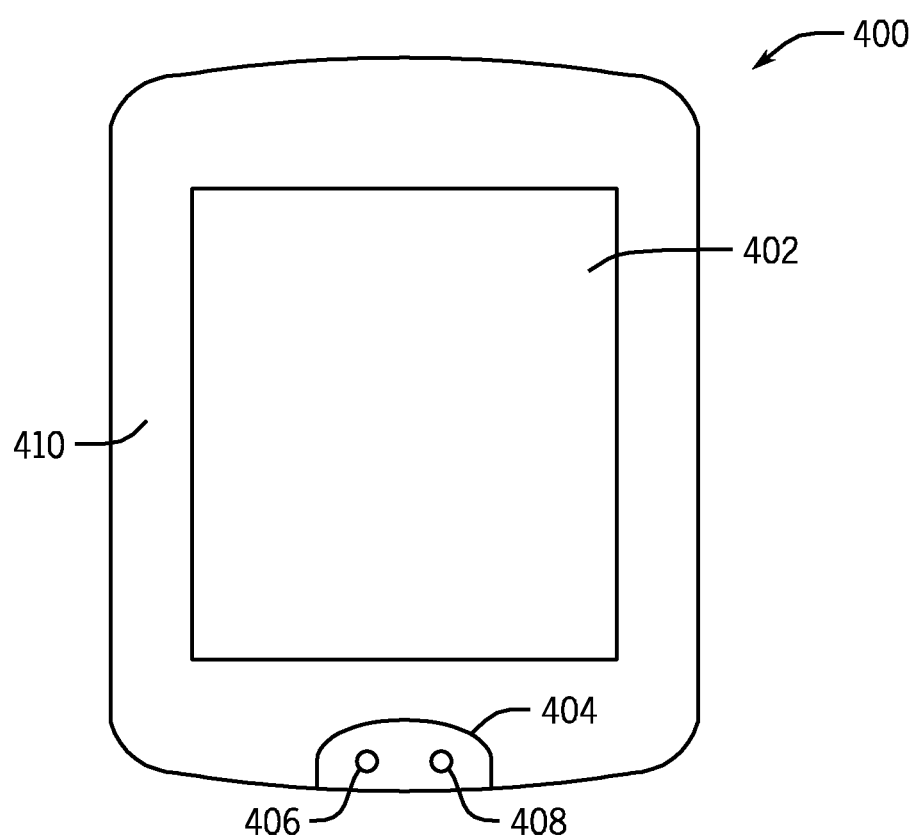
FIG. 4 is a front elevational view of a computing device according to one embodiment.

A processor-based device 400, namely any device that includes a processor, shown in FIG. 4 may be used in some embodiments of the present invention. It may be any processor-based device including a computer, a tablet, an e-book reader, a mobile Internet device, a cellular telephone, a watch, a remote control for a television or other entertainment device, or an entertainment device, to mention some examples. In many embodiments, the sensor may be incorporated into the body of the processor-based device and in some embodiments it may be incorporated into regions of the device on which the user must normally make contact. For example it may be incorporated into touchpads, user operable buttons, or other surfaces on the body where the user may make human contact, typically with the finger, with one or more fingers.

In some embodiments, two human body securable electrodes of contacts 406 and 408 may be used to make two different measurements of a characterizing human physiological condition. Thus, the processor-based device 400 may include a contact area 404 which may be simply the surface of a housing or a maybe a touch or pushbutton, normally pushed or touched in order to operate the device. In addition, the device 400 may typically have a display screen 402.

In this example, when the user puts his or her fingers on the contact area 404, for example, to begin operation of the device, the user makes electrical contact with the two contacts 406 and 408. Then two different electro-biometric measurements may be made, in some embodiments seriatim automatically without even notifying the user. That is, simply by attempting to operate the device, the device may automatically, entirely on its own, take two biometric measurements and use those measurements in order to identify the user. The user may be identified, for example during the normal boot-up sequence of the device 400, and the user may in some cases have no idea that a biometric analysis for purposes of authentication has been undertaken. In some cases the device 400 cannot be used if authentication fails.

In addition, the physiological data that is captured may be stored and used for a variety of purposes. It may be used for monitoring the health of the individual user in some embodiments. It may be aggregated with information made over a computer network automatically with information from a variety of other users in order to track physiological trends.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "non-transitory computer-readable storage medium" and "non-transitory computer-readable storage media" as used herein refer to any medium or media that participate in providing instructions to a CPU for execution. Such media can take many forms, including but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patters of marks or holes, a RAM, a PROM, an EPROM, an EEPROM, a flash EEPROM, a non-flash EEPROM, any other memory chip or cartridge, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The following clauses and/or examples pertain to further embodiments:

One example embodiment may be a method comprising providing a sensor on a processor-based device to obtain first biometric data related to a first human physiological characteristic and second biometric data related to second human physiological characteristic different from said first human physiological characteristic, and enabling said first and second data to be used to authenticate an operator of the processor based device. The method may also include providing the same contacts to obtain said first and second biometric data. The method may also include enabling collection of said first biometric data then obtaining said second biometric data. The method may also include enabling heart rate data and body impedance data collection using the same contacts. The method may also include incorporating said contacts into a surface of an input/output device of a computer.

In another example embodiment may be one or more computer readable media storing instructions executed by a processor-based device to perform a sequence comprising obtaining first biometric data related to a first human physiological characteristic and second biometric data related to second human physiological characteristic different from said first human physiological characteristic, and using said first and second data to authenticate an operator of the processor-based device. The media may further include using the same contacts to obtain said first and second biometric data. The media may further include collecting of said first biometric data then obtaining said second biometric data. The media may further include using heart rate data and body impedance data collection using the same contacts. The media may further include using said contacts in a surface of an input/output device of a computer. The media may further include using said contacts on a cellular telephone. The media may further include using said contacts on a remote control.

Another example embodiment a processor-based device comprising a sensor to obtain first biometric data related to a first human physiological characteristic and second biometric data related to second human physiological characteristic different from said first human physiological characteristic, and a a processor coupled to said sensor to use said first and second data to authenticate an operator of the processor-based device. The device may include said sensor to obtain heart rate data as one of said first and second biometric data. The device may include said sensor to obtain body impedance data as one of said first and second biometric data. The device may include said sensor to use a pair of contacts to obtain one of said first and second biometric data. The device may include said sensor to use the same contacts to obtain said first and second biometric data. The device may include said sensor to collect of said first biometric data then obtaining said second biometric data. The device may include said sensor to use heart rate data and body impedance data collection using the same contacts. The device may include said sensor to use said contacts in a surface of an input/output device of a computer.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing a sensor on a processor-based device to obtain heart rate data and body impedance data;
   enabling said heart rate and body impedance data to be used to authenticate an operator of the processor based device; and
   enabling said heart rate data and body impedance data collection using one pair of surface contacts simultaneously touched by the user to enable both impedance and heart rate measurements.

2. The method of claim 1 enabling collection of said heart rate data then obtaining said impedance data.

3. The method of claim 1 including incorporating said contacts into a surface of an input/output device of a computer.

4. The method of claim 1 including providing said contacts on a cellular telephone.

5. The method of claim 1 including providing said contacts on a remote control.

6. One or more computer readable media storing instructions executed by a processor-based device to perform a sequence comprising:
   measuring both heart rate and body impedance while the user is touching one pair of surface contacts;
   obtaining heart rate data and body impedance data; and
   using said heart rate and body impedance data to authenticate an operator of the processor-based device.

7. The media of claim 6, said sequence further including collecting of said heart rate data then obtaining said impedance data.

8. The media of claim 6, said sequence further including using said surface contacts in a surface of an input/output device of a computer.

9. The media of claim 6, said sequence further including using said surface contacts on a cellular telephone.

10. The media of claim 6, said sequence further including using said surface contacts on a remote control.

11. A processor-based device comprising:
    a sensor to obtain heart rate data and body impedance data;
    surface contacts coupled to said sensor so that said heart rate data and body impedance data is collected using the same contacts by collecting heart rate via the contacts used for body impedance measurements; and
    a processor coupled to said sensor to use said heart rate and body impedance data to authenticate an operator of the processor-based device.

12. The device of claim 11, said sensor to collect said heart rate data then obtaining said body impedance data.

13. The device of claim 11, said sensor to use said contacts in a surface of an input/output device of a computer.

14. The device of claim 11, said device being a cellular telephone.

15. The device of claim 11, said device being a remote control.

* * * * *